D. N. B. COFFIN, Jr.
Elastic Cable-Stoppers.

No. 157,736.  Patented Dec. 15, 1874.

Witnesses.
Frank K. Rogers.

Inventor.
David N. B. Coffin Jr.

THE GRAPHIC CO. PHOTO-LITH. 39 & 41 PARK PLACE, N.Y.

UNITED STATES PATENT OFFICE.

DAVID N. B. COFFIN, JR., OF NEWTON, MASSACHUSETTS.

IMPROVEMENT IN ELASTIC CABLE-STOPPERS.

Specification forming part of Letters Patent No. 157,736, dated December 15, 1874; application filed October 31, 1874.

*To all whom it may concern:*

Figure 13:
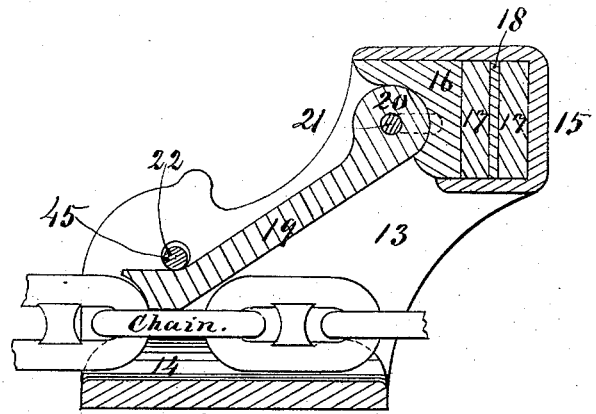
Figure 14:
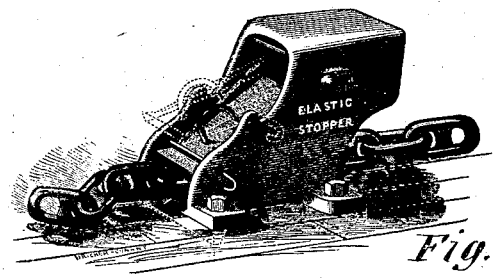
Figure 15:
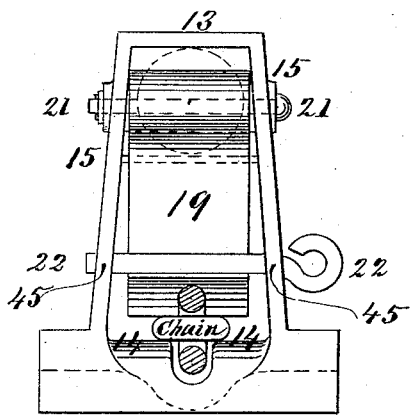

Be it known that I, DAVID N. B. COFFIN, Jr., of the city of Newton, county of Middlesex and State of Massachusetts, have invented an Improved Elastic Chain-Stopper, of which the following is a specification:

With reference to the accompanying drawings, comprising three figures, 13, 14, and 15, Fig. 13 is a longitudinal vertical section in the line of the chain cable, which is shown in connection. Fig. 14 is a perspective view. Fig. 15 is an end view of the inboard end.

A base and chainway, 14, has formed in connection the sides 13, connecting it to a spring case or chamber, 15. In the chamber 15 are placed the elastic cushions 17, of rubber or other suitable spring material. One or more springs may be used; when several are used the plates 18 may be introduced to separate them. A follower, 16, is fitted freely to the chamber, and is provided with a suitable seat or resting-place for the end 20 of the chain-pawl 19.

The sides are slotted, and a suitable pin, 21, passes through the slots and pawl, and serves to keep the end 20 of the pawl in connection with the follower 16; but the pin is free to travel in the slots with the fore and aft movement of the pawl 20 and follower 16.

As the chain is hauled in, the pawl 19 lifts and drags on it; but on any movement of the chain outward, the pawl engages the link, as see Fig. 13, and holds it safely with an elastic hold.

Any surging of the chain is transmitted through the pawl 19 and follower 16 to the elastic cushions or springs 17, whereby the chain is gradually checked, and saved from the danger of breaking, to which it would be subjected if held by a rigid or non-yielding stopper, windlass, or other connection to the vessel.

The pawl 19 has near its lower end a flat portion, to play under a pin, 22, which is inserted through holes in the sides, in cases of great danger, to prevent any possibility of the pawl's letting go of the chain. The pawl may be lifted by means of the handle shown in Fig. 14, and the pin 22 laid under it across the sides in the depressions 23, for the purpose of holding the pawl up when the chain is required to run out.

When the spring material is inclosed in a chamber, as shown, with suitable space for lateral expansion, but no sufficient opening for escape or bursting out when overworked, the worst that can come is compression of the spring to a solid.

The great danger with other elastic stoppers is that, when worn or overworked, the rubber bursts out, and a dangerous surge is the result.

I claim—

1. A suitable yielding pawl, 19, in combination with a cable or chain stopper bed, provided with a spring-chamber, 15, and a chainway, 14, substantially as shown and described.

2. A traversing pawl having a movement in the direction parallel to, or approximately parallel to, the chain-way, in combination with a stationary bed to support the chain, substantially as described.

3. The combination of a pawl having a fore and aft movement in relation to the chain-bed with the springs 17 and follower 16.

D. N. B. COFFIN, JR.

Witnesses:
LYSANDER BURNETT,
BENJAMIN WOODWARD.